US012587549B2

(12) United States Patent
Tobin

(10) Patent No.: US 12,587,549 B2
(45) Date of Patent: Mar. 24, 2026

(54) INFORMATION SECURITY USING BLOCKCHAIN TECHNOLOGY

(71) Applicant: Kevin Tobin, Avon, CT (US)

(72) Inventor: Kevin Tobin, Avon, CT (US)

( * ) Notice: Subject to any disclaimer, the term of this patent is extended or adjusted under 35 U.S.C. 154(b) by 1181 days.

(21) Appl. No.: 17/498,621

(22) Filed: Oct. 11, 2021

(65) Prior Publication Data

US 2022/0103584 A1    Mar. 31, 2022

Related U.S. Application Data

(63) Continuation-in-part of application No. 16/200,633, filed on Nov. 26, 2018, now Pat. No. 11,146,532.

(60) Provisional application No. 62/591,181, filed on Nov. 27, 2017.

(51) Int. Cl.
| | |
|---|---|
| *G06F 21/55* | (2013.01) |
| *H04L 9/32* | (2006.01) |
| *H04L 9/40* | (2022.01) |
| *H04L 9/00* | (2022.01) |

(52) U.S. Cl.
CPC ........ *H04L 63/1425* (2013.01); *H04L 9/3297* (2013.01); *H04L 63/1416* (2013.01); *H04L 63/1466* (2013.01); *H04L 9/50* (2022.05)

(58) Field of Classification Search
CPC .............. H04L 63/1425; H04L 9/3297; H04L 63/1416; H04L 63/1466; H04L 9/50; H04L 63/0236; H04L 63/12; G06F 21/55
See application file for complete search history.

(56) References Cited

U.S. PATENT DOCUMENTS

| | | | |
|---|---|---|---|
| 8,990,944 B1 | 3/2015 | Singh et al. | |
| 9,635,000 B1 | 4/2017 | Muftic | |
| 9,774,578 B1 | 9/2017 | Ateniese et al. | |
| 10,091,228 B2 | 10/2018 | Li et al. | |
| 10,135,607 B1 | 11/2018 | Roets | |
| 11,893,626 B2 * | 2/2024 | Youb ................... | G06F 16/1805 |
| 2007/0239961 A1 | 10/2007 | Noguchi et al. | |

(Continued)

OTHER PUBLICATIONS

Aaron Wright & Primavera De Filippi, Decentralized Blockchain Technology and the Rise of Cryptographia, Journal Paper, Mar. 20, 2015, Social Science Research Network, Available at SSRN: https://ssrn.com/abstract=2580664 or http://dx.doi.org/10.2139/ssrn.2580664.

(Continued)

*Primary Examiner* — Quazi Farooqui
(74) *Attorney, Agent, or Firm* — Kritzer McPhee LLP

(57) ABSTRACT

Blockchain technology is used to provide security of electronic systems. The disclosed technology allows for a dynamic bond of trust to be applied to the field of information security without the need for a single point of trust to first be established. The lines of trust between electronic systems or devices is established by distributing information among the systems or devices. This allows for easy identification of commonalities and/or decision making whereby policy(s)/action(s)/monitoring/etc. can be enforced when those commonalities align. Simultaneously, deviations from those commonalities can be identified and policy(s)/action(s)/monitoring/etc. may also be invoked. The use of blockchain technology enables investigative and responsive actions to detect and exploit a potential attacker on a network.

20 Claims, 10 Drawing Sheets

(56) References Cited

U.S. PATENT DOCUMENTS

| | | |
|---|---|---|
| 2012/0216259 A1 | 8/2012 | Okamoto et al. |
| 2016/0275461 A1 | 9/2016 | Sprague et al. |
| 2017/0331896 A1 | 11/2017 | Holloway et al. |
| 2018/0131716 A1* | 5/2018 | Chantz ................ H04L 63/1425 |
| 2019/0036906 A1* | 1/2019 | Biyani .................. H04L 63/102 |
| 2019/0102850 A1* | 4/2019 | Wheeler .............. G06Q 20/405 |
| 2019/0141024 A1 | 5/2019 | Wang et al. |
| 2019/0296915 A1 | 9/2019 | Lancashire |
| 2019/0349426 A1 | 11/2019 | Smith et al. |

OTHER PUBLICATIONS

Zibin Zheng et al., An Overview of Blockchain Technology: Architecture, Consensus, and Future Trends, Conference Paper, Jun. 2017, 2017 IEEE 6th International Congress on Big Data.

* cited by examiner

FIG. 4

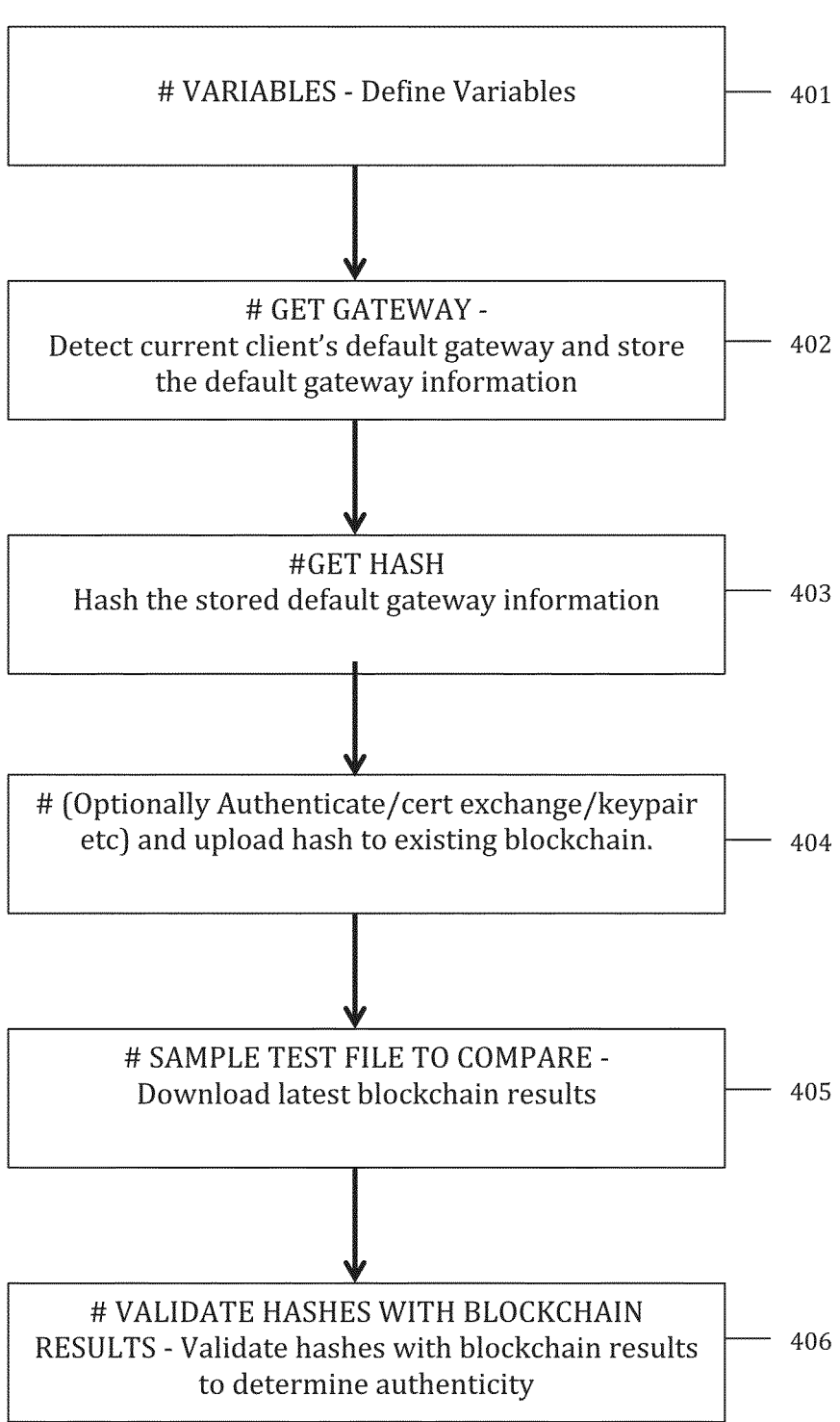

VARIABLES - Define Variables      401

GET GATEWAY -
Detect current client's default gateway and store
the default gateway information      402

GET HASH
Hash the stored default gateway information      403

(Optionally Authenticate/cert exchange/keypair
etc) and upload hash to existing blockchain.      404

SAMPLE TEST FILE TO COMPARE -
Download latest blockchain results      405

VALIDATE HASHES WITH BLOCKCHAIN
RESULTS - Validate hashes with blockchain results
to determine authenticity      406

INFORMATION SECURITY USING BLOCKCHAIN TECHNOLOGY

CROSS-REFERENCE TO RELATED APPLICATION

This application is a continuation-in-part of U.S. patent application Ser. No. 16/200,633, filed Nov. 26, 2018, now U.S. Pat. No. 11,146,532, which claims the benefit of U.S. Patent App. No. 62/591,181, filed Nov. 27, 2017, and the foregoing applications are incorporated by reference herein in their entirety.

BACKGROUND

Blockchain technology has served as the basis of many new technologies, such as the rise of crypto-currencies. Blockchains take different forms, and may comprise a distributed, public or centralized ledger that acts as a single source of truth for information. With cyber attackers frequently targeting sensitive information, there is a need for a way to protect sensitive information from cyber attacks, such as Man in the Middle ("MITM") attacks. Further, there has been a problem in the dissemination of a trusted key, password, passphrase, certificate, PIN, etc., to one party, which creates a security vulnerability that risks compromising the entire collection of sensitive information. Therefore, there is a need for a technology that can protect sensitive information from cyber attacks, such as MITM attacks, and security risks arising from the potential disclosure of a single trusted key, password, passphrase, certificate, PIN, etc.

The elements of blockchain technology are known in the art. See, for example, "An Overview of Blockchain Technology, Architecture, Consensus, and Future Trends" by Zibin Zheng, et al., IEEE Int'l Congress on Big Data Conference Paper, June 2017 (accessed at https://www.researchgate.net/publication/318131748_An_Overview_of-_Blockchain_Technology_Architecture_Consensus_and-_Future_Trends), and "Decentralized Blockchain Technology and the Rise of Lex Cryptographia" by Aaron Wright and Primavera de Filippi, Social Science Research Network Paper, Mar. 10, 2015 (accessed at https://papers.ssrn.com/sol3/papers.cfm?abstract_id=2580664), which explain the basics of this technology and are herein incorporated by reference.

SUMMARY

By leveraging certain configurations, properties and/or attributes of similar electronic devices to generate a baseline of normalcy, a shared fingerprint of a known good configuration emerges. Deviations from the norm, as determined through the outliers from the majority, can be flagged as potentially malicious. The selection of properties and/or number of attributes to monitor may impact the predetermined severity of a suspected compromise. The use of blockchain technology enables investigative and responsive actions to detect and exploit a potential attacker on a network.

BRIEF DESCRIPTION OF THE DRAWINGS

The detailed description makes reference to the accompanying figures wherein:

FIG. 4 illustrates a flow diagram of the pseudo-code for the informational security method in accordance with the principles disclosed herein.

Figure 1:
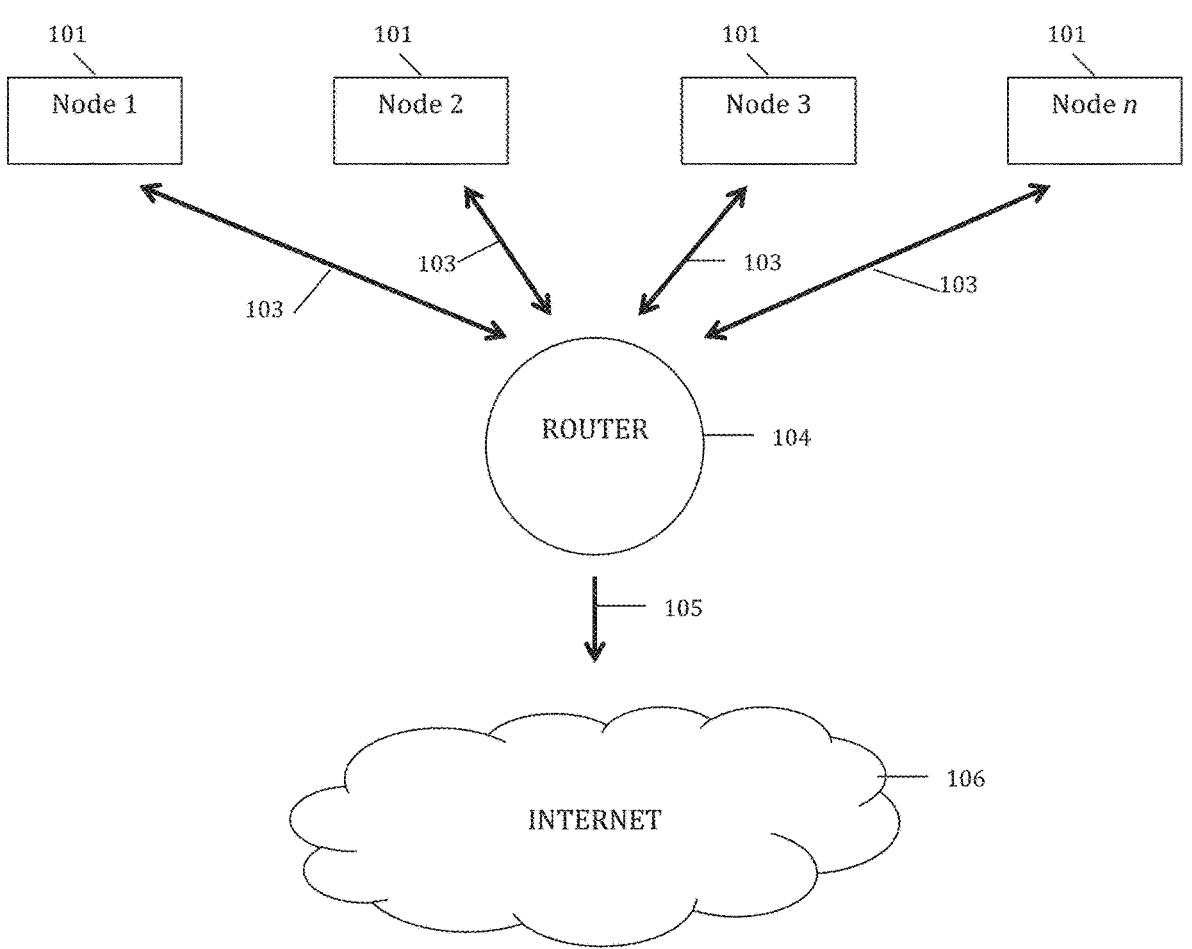
FIG. 1 illustrates a diagram of the informational security system in accordance with the principles disclosed herein.

The figures are intended to facilitate the description of the principles disclosed herein. The figures do not illustrate every aspect of the principles disclosed herein and do not limit the scope of the principles disclosed herein. Other objects, features, and characteristics will become more apparent upon consideration of the following detailed description.

DETAILED DESCRIPTION

A detailed illustration is disclosed herein. However, techniques, methods, processes, systems and operating structures in accordance with the principles disclosed herein may be embodied in a wide variety of forms and modes, some of which may be quite different from those disclosed herein. Consequently, the specific structural and functional details disclosed herein are merely representative.

None of the terms used herein, including "a," "an," "the," and "their," are meant to limit the application of the principles disclosed herein. The use of "or" is intended to include "and/or," unless the context clearly indicates otherwise. The use of "attacker" is intended to encompass a device that has been compromised or otherwise should no longer be trusted. Where context permits, the use of "token" or "coin" includes a partial token or coin. The terms are used to illustrate the principles disclosed herein and are not intended to be limiting. References to encryption should be understood to include encryption at rest and/or in transit as applicable. Further, references to a single network or a single device (e.g., router) should not be viewed as limiting, as the description herein is intended to facilitate understanding. The principles disclosed herein may be applied to multiple interconnected networks, and additional information used in the system may include, without limitation, other attributes such as a trace-route of hops, and hardware and/or software information.

Disclosed herein is a system and method of invoking informational security through the use of blockchain technology. By leveraging the known information of the masses at any given point in time, a baseline of trust can be inferred. Alterations from this baseline can be used to identify potentially malicious actor(s) that have interfered with this trust. At the same time, the reverse can also be achieved, whereby an object (such as a key, password/passphrase, PIN, code, certificate, biometric marker, authentication token, etc.) that is trusted, can be disseminated among various parties where no one user maintains control of the trusted object. Only during times when all factions of the dissemination are complete can the trusted object be invoked.

In one example, the system and method of invoking informational security can secure monitored properties and mitigate MITM attacks. The implementation can be such that the information communicated by a network device or the client or host system tracks its current communications device, such as for example a default gateway. For illustrative purposes, a default gateway is referenced in the description below.

The default gateway is normally a prime target of an attacker to gain MITM positioning. The attacker will spoof the attacker's network information (such as an IP/MAC address, but other network information is contemplated as well) to the default gateway (commonly a router, but other default gateways are contemplated as well) and claim to be that of its intended victim. Simultaneously, the attacker will target the victim and spoof similar network information and claim to be the default gateway. This forces the victim's traffic to the attacker before reaching the true default gateway, where the attacker offloads the victim's original traffic in order to complete the connection and leaving the victim completely unaware of the interception.

In the event where an organization is concerned about insider threats or MITM attacks, each computer or electronic device, including but not limited to a cell phone, automobile, router, or internet connected device, etc. (herein referred to as "node"), can contain software that periodically tracks the IP/MAC address of the default gateway. This information is collected, optionally encrypted at-rest and/or in transit, and shared amongst other nodes. All nodes within the same network segment in a secured environment would share similar properties regarding the default gateway. The periodic checking can then be configured to take evasive action (such as quarantining that node to restrict access to certain or all resources), invoke logging, commence simple monitoring, and/or no action at all. While encryption is optional, encrypting the collected information increases the security of the information and is preferably utilized.

The information can be stored across each node (known as a decentralized model) or on a separate device (known as a centralized model) where all nodes report this information.

When a network device such as a router (gateway), switch, access point, etc. is replaced, since all devices on the network would witness the change at the same time, all devices would maintain an agreement and thus transfer that trust to the new device. There is no need to reconfigure the baseline of trust as it occurs dynamically. This concept of monitored properties can apply to nearly any attribute of a node. Monitoring various attributes of nodes and comparing them among others, such as registry keys, software, various configurations, etc., can enhance anti-virus capabilities.

Security measures may be taken in response to the network detecting an information breach. These security measures include, but are not limited to, quarantining the compromised node, restricting the compromised node's access to certain or all resources in the system, monitoring and collecting information about the attacker from the compromised node, or retaining all forensic information about the attacker, including media access control (MAC) address, Internet Protocol (IP) address, and date and time of the attack. If so desired, the system can be configured to allow no action to be taken as well. Other security measures may be implemented as well.

In general, a larger number of nodes in the system provides for a more secure system. However, performance of the system is impacted by a large number of nodes, and the performance of such a system may become too slow for practical use. Pruning the blockchain prevents it from going beyond this critical point and becoming too large. Specifically, the oldest elements are permitted to fall off so long as a pre-determined threshold of data is sufficiently and accurately synchronized across the nodes. It may be determined that if all nodes agree on the stored data (for example, from 7 years ago), then this data no longer needs to be retained. The pruning process can begin to truncate the oldest elements, allowing the chain of nodes to pick up at an agreeable point in time, until the next truncation takes place, which can be automatic or scheduled. A smart contract may be used to adjust if, when, and how truncation occurs. Pruning can be used to optimize the size of data, performance, user experience, specific dates and events, etc. Pruning can become important because network connectivity is dynamic and requires speed. Attempting to validate a plurality of nodes without this mechanism may impact usability of the system. The frequency of scheduled pruning or the identification of trigger events to begin pruning can be configured based upon what the implementer of the system prioritizes, such as security or performance. For example, less frequent pruning may be sought by users seeking more security, while more frequent pruning may be sought by users seeking performance. Pruning can be based on time, size of data, speed of performance, or upon a specific event or date, and other ways of invoking pruning may be implemented as well.

Pruning comes with its own limitations. An attacker that is able to trick the components into accelerating the hardware or software clock time can create an environment where data gets purged more frequently than expected. Additionally, if data size is the primary indicator to signal a purge, then an attacker may attempt to accelerate the amount of data that gets ingested which could force pruning to occur more frequently than expected. The hardware/software clock is critical to the integrity of the system, so if the clock is able to be attacked, this may lead to the inability to trust data. Thus, integrity checks are important to the operation of the system.

Another example allows for the customization of data to be collected as well as when and/or where that data is collected. For example, if user takes a work device home, it could be configured to optionally not update the blockchain, but merely provide a warning to the user that they are currently "off-network" and/or not contributing to the blockchain, and their usage of the laptop/cell phone/device/etc. may be restricted to certain pre-approved activities, resources, etc. In a decentralized model, the blockchain may still be updated, but may observe a more permissive threshold before flagging another device.

In another example, the system and method of invoking informational security can minimize the risk of compromising sensitive data from a single point of power. There are many instances where a single user is trusted with a high privileged master key that empowers the user to have such high-level access that it could pose a threat to the organization if control of that master key is ever lost, stolen, sold, traded, or used maliciously (or even mistakenly) by that single user. The principles disclosed herein offer a way to protect that high level access without requiring the trust of any single one individual.

To achieve this, the master key is instead disseminated among various entities or nodes, and optionally encrypted. Like pieces of a puzzle, the master key can only be reassembled via the blockchain. Once all users with a piece of that key declare its use (and within a certain timeframe), the key can be invoked with all of its intended privileges. Only when all users with pieces of the key declare their use can the sensitive data be reached. If only a portion of the users with pieces of the key declare their use, the sensitive information will remain locked and secured. Therefore, the only way of reaching the sensitive data is by assembling all pieces of the key through the blockchain, thereby creating one master key to access the sensitive data.

This is not limited to authentication, but can also be applied to specific activity types, if so desired. One other example might be the restriction of any activity that would involve a deletion or change of access unless all parties holding a partial key come to a consensus. Other applications of this technology are also considered.

The flowcharts and general diagrams illustrate the architecture, functionality, and operation of possible implementations of the principles disclosed herein. In this regard, each block in the flowcharts or general diagrams may represent a segment or portion of instructions, which include one or more executable instructions for implementing the specified functions. In some alternative implementations, the functions noted in the diagrams or flowcharts may occur out of the order noted in the figures. For example, two blocks in a flowchart shown in succession may, in fact, be executed substantially concurrently.

Referring to FIG. 1, a general diagram of the system for invoking informational security utilizing blockchain is shown. In this example, nodes 1, 2, 3 . . . n 101 share information between each other via router 104. Each node 101 individually communicates information to the router 104, depicted by router connections 103. The router 104 then communicates with the Internet 106 through a separate connection 105. This general scheme allows each nodes 1-*n* 101 to share information with each other. The information is shared via a communication network, which may be made up by a wired/wireless network/wireless transmission(s)/NFC/Bluetooth/etc. and/or the separate connection 105, which may, for example, be Internet protocols. Each individual router connection 103 allows the information to travel from node 1 101 to/from the router 104, node 2 101 to/from the router 104, node 3 101 to/from the router 104, and so on to node n 101 to/from the router 104. As long as the information traveling along each of these router connections 103 is (preferably signed with each node's private key) identical, then the system can be considered secure and authentic. If the information traveling via each router connection 103 is not identical, then the system knows there has been a security breach, and can isolate and/or notify the node 101 giving the incorrect information that it has been compromised.

It should be understood that peer to peer communications between nodes may be implemented. In such a configuration, a MITM security attack may target the communications between two or more nodes. In such a configuration, the principles disclosed herein may be applied to detect such a MITM security attack, allowing the system to isolate and/or notify the affected node(s).

Figure 2:
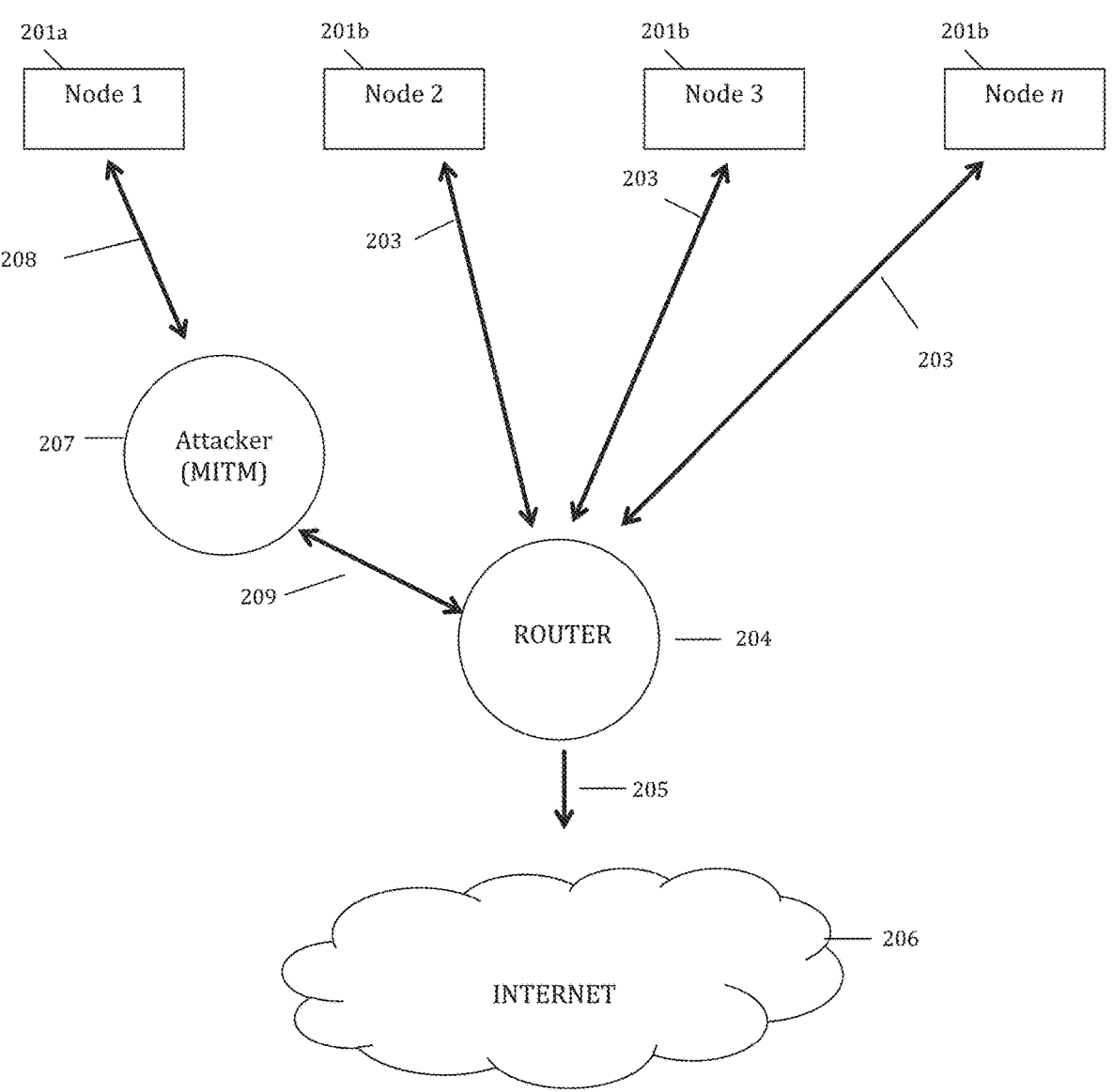
FIG. 2 illustrates a diagram of the informational security system when attacked in accordance with the principles disclosed herein.

FIG. 2 shows a diagram of an exemplary MITM security attack. In this example, each node 201*b* communicates with each other via router 204. As in FIG. 1, the router 204 sends information to the Internet 206 through a separate connection 205. However, a MITM attacker 207 is attempting to become the middle communication point between node 1 201*a* and the router 204. The attacker 207 does so by mimicking the connection that would have otherwise existed between node 1 201*a* and router 204. The attacker 207 intercepts the secured information from node 1 201*a* that is now moving along the connection 208. The attacker 207 then transfers the data along the separate connection 209 to the router 204, leaving little to no trace of the attack. This fools node 1 201*a* into thinking it is communicating with router 204 when it is really communicating with the attacker 207.

However, applying the principles disclosed herein, node 1 201*a* is still communicating with nodes 2-*n* 201*b* via attacker 207 and router 204, and nodes 2-*n* 201*b* are still communicating with each other via their connections 203 to router 204. When an attack, such as this MITM attack, occurs, the information regarding the router 204 that node 1 201*a* is communicating to nodes 2-*n* 201*b* differs from the information regarding the router 204 that nodes 2-*n* 201*b* are communicating. This discrepancy allows the chain of nodes to identify the compromised node 1 201*a*, quarantine node 1 201*a* due to the breach, and/or initiate other actions to notify node 1 201*a* that it has been compromised and to prevent or discontinue communications along the connection 208. For example, a notification with the MAC address and/or other identifying information regarding attacker 207 can be communicated to node 1 201*a* or its operator. Examples of such a notification include a pop-up message, toaster message, mobile notification, email, RSS feed, SMS, text message, or other suitable alert format. This information can optionally be broadcast to others as well. This action(s) prevents the secured information that node 1 201*a* would have sent to attacker 207 from ever traveling along connection 208, therefore securing the system.

As described above with reference to FIG. 1, it should be understood that peer to peer communications between the nodes may be implemented. In such a configuration, the principles disclosed herein may be applied to detect such a MITM security attack, allowing the system to isolate and/or notify the affected node(s).

Figure 3:
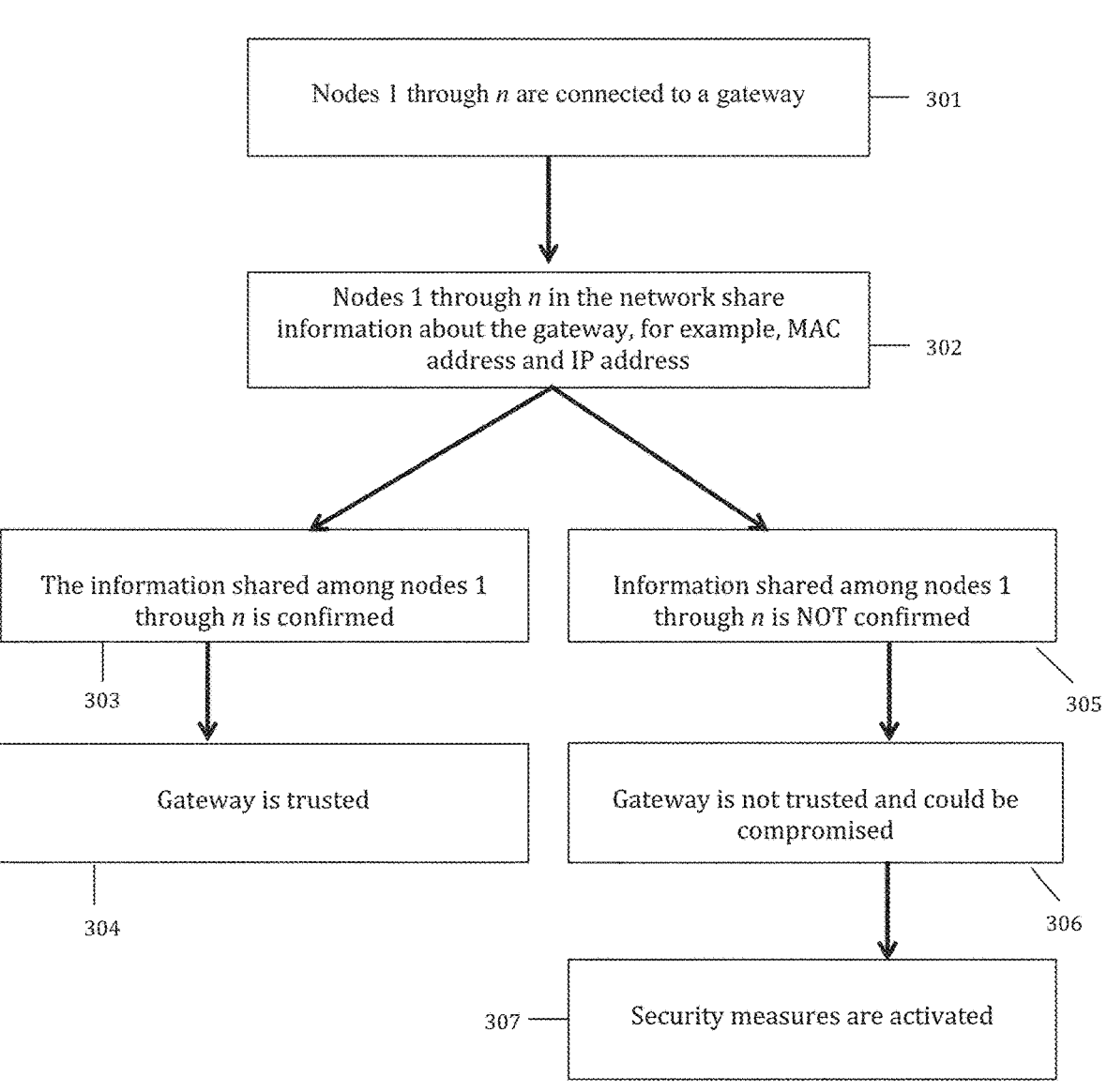
FIG. 3 illustrates a flow diagram of the informational security method in accordance with the principles disclosed herein.

Referring to FIG. 3, a flow chart of the method for invoking informational security is illustrated. In step 301, all nodes 1 through n are connected into a single network. Each of these nodes in the network have the ability to communicate with each other. In step 302, the network is connected to a default gateway, commonly a router. Now each of the nodes can communicate with the default gateway. Nodes 1 through n in the network share information about the default gateway with each other. In this step 302, all nodes will share information about the default gateway (for example MAC address, IPv4 address, Subnet Mask, Internet address, etc., but other information about the default gateway is contemplated) with all of the nodes in the network, thereby creating a record of information about the default gateway. If the record of information is identical, as in step 303, then the gateway is trusted as in step 304, and the nodes communicate with the gateway. If the record of information is not all identical, as in step 305, then the default gateway is not trusted and could be compromised, as shown in step 306. If this situation occurs, the next step 307 is to stop communications from the affected node(s) to the unauthenticated gateway and activate any predetermined security measures, such as isolating the node(s) sending the dissimilar information.

Referring to FIG. 4, a flow chart of the pseudo-code for the method for invoking informational security is illustrated. Beginning with step 1 401, the system defines a set of variables. This may include defining or creating a file to store information or setting up a hash, but other variables may be used as well. Next, in step 2 402, the system detects the current client's default gateway information and stores the information. Then, in step 3 403, the system hashes the stored default gateway information. This allows the system to create an easily identifiable record of information that can be used for comparisons in later steps. The hash may be optionally encrypted for higher security. Encrypting the hash prevents any attacker from attempting to lie to other nodes about what hashes exist in the system, further adding to the security of the system. Next, in step 4 404, the system uploads the hash to the existing blockchain, and may optionally authenticate or keypair at this time. This creates the baseline of trust between the nodes of the blockchain. Then, in step 5 405, the system downloads the latest blockchain results at some predetermined later point in time. Lastly, in step 6 406, the blockchain results and hashes are compared to each other, and if they are identical, then the hashes are validated and the connection is authentic and secure. If they are not identical, then the hashes are not validated, and the connection is not secure, at which point security measures may be taken.

Figure 5:
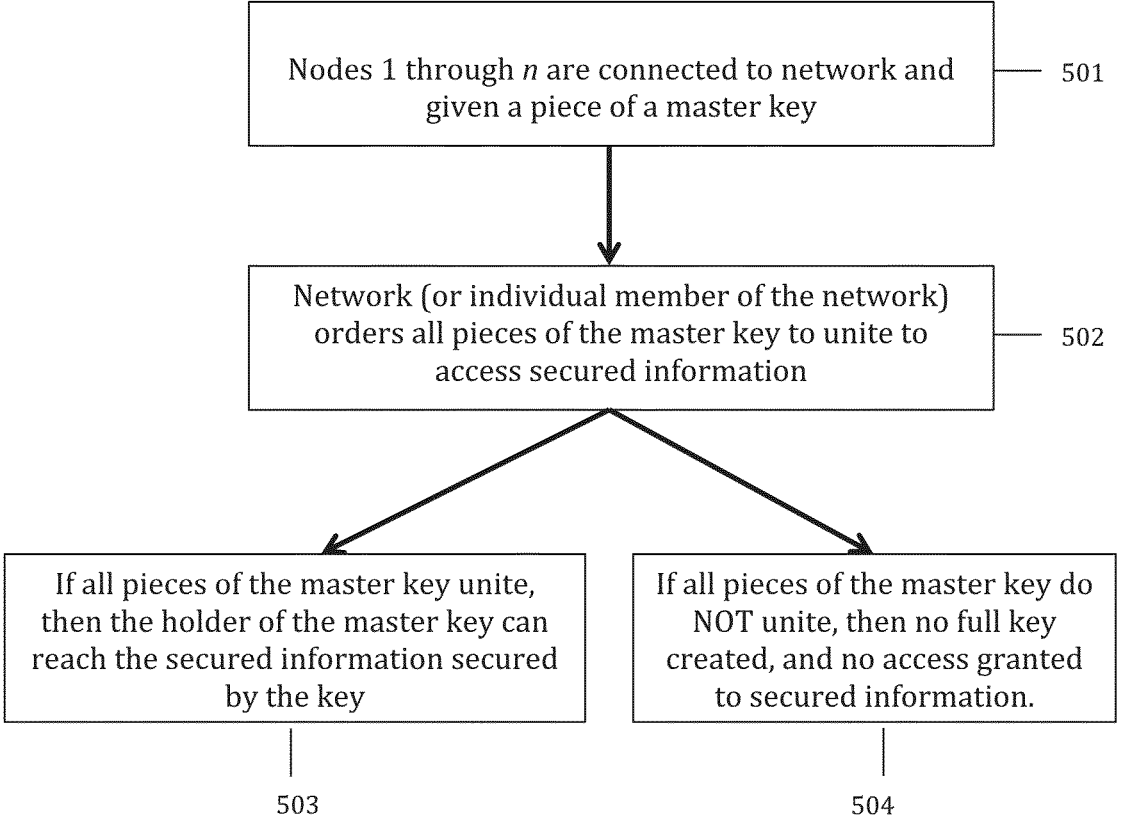
FIG. 5 illustrates a flow diagram of the master key security method in accordance with the principles disclosed herein.

Referring to FIG. 5, a flow chart of the master key example is illustrated. In this example, the first step 501 has the system connect Nodes 1 through n to a network. Each node in the network then receives a predetermined portion of a master key. The master key cannot be used unless all of the portions are brought together, like a puzzle, to form the full master key. Next, in step 2 502, the network, or an individual member of the network, will command all the pieces of the master key to come together in order for the network or individual to access a piece of secured information. Once this command occurs, the pieces will either unite and the system will proceed to step 3a 503, or not unite and the system will proceed to step 3b 504. If all pieces of the master key unite, as in step 3a 503, then the network or individual who made the command will have a complete master key, therefore allowing the network or individual to access the secured information sought. If all pieces of the master key do not unite, as in step 3b 504, then the full master key is not created, and no access will be granted to the network or individual who sought the command. Therefore, this system and method protects any secured information from being compromised by the misuse of a single master key by one single individual, thereby reducing the risk of compromising the secured information.

Figure 6A:
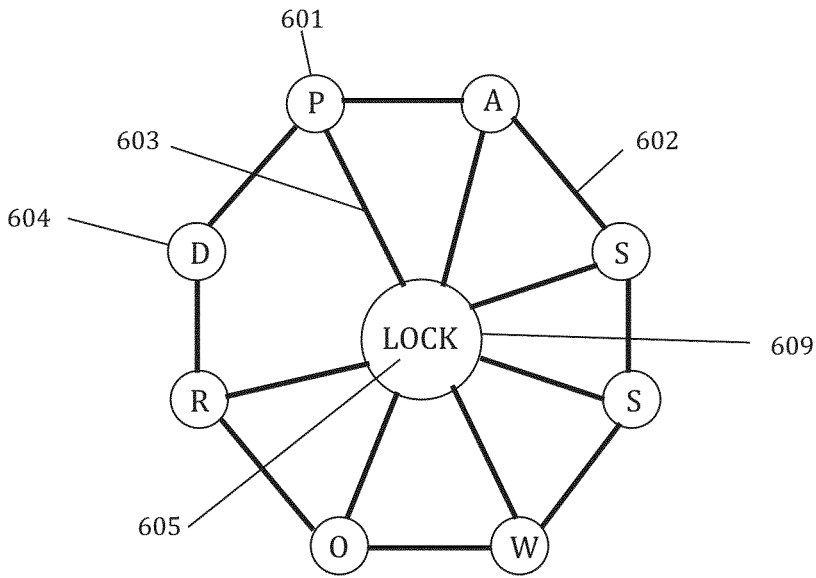
FIG. 6A illustrates a diagram of the master key security method in a locked configuration in accordance with the principles disclosed herein.
Figure 6B:
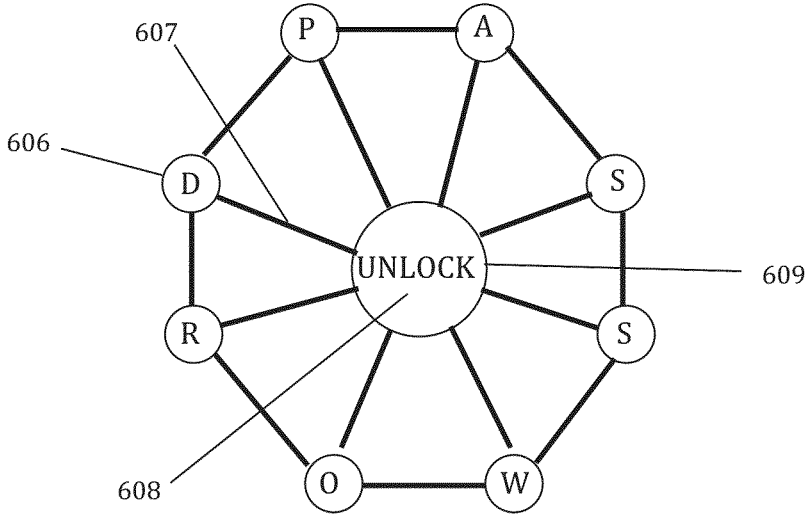
FIG. 6B illustrates a diagram of the master key security method in an unlocked configuration in accordance with the principles disclosed herein.

Referring to FIGS. 6A and 6B, a diagram of the master key example in a locked and unlocked configuration is illustrated. In this example, nodes 601 are all structured to contain a portion of the key to access stored secured information 609. In this example, the portions of the key are represented by the individual letters of "PASSWORD." All of the nodes 601 communicate with each other through communication channels 602. Each node 601 also communicates with the stored secured information 609 through communication channels 603. The communication channels 603 allow each node 601 to report their individual piece of the master key to the stored secured information 609. FIG. 6A illustrates when the stored secured information 609 is in a locked configuration 605. In this example, the nodes 601 containing the master key pieces "PASSWOR" are all reporting the stored secured information 609. However, the node 604 containing the last piece of the master key, "D" here, is not reporting to the stored secured information 609. This places the stored secured information 609 in a locked configuration 605 because not all pieces of the master key have come together to form "PASSWORD" and allow access. FIG. 6B illustrates when the stored secured information 609 is in an unlocked configuration 608. In this example, all nodes containing the master key pieces "PASSWORD" are all reporting the stored secured information 609. Here, node 606 containing "D" and the rest of the nodes 601 are reporting to the stored secured information 609 through a communication channel 607. This assembles the complete master key, here "PASSWORD," and places the stored secured information 609 in an unlocked configuration 608. Increased security can be achieved through this model by increasing the number of nodes 601 who contain pieces of the master key. The larger number of nodes 601, the more secure the stored secured information 609. This example is not intended to be limiting, and the "PASSWORD" master key example is purely illustrative. The number of nodes 601 may be greater or less than illustrated in this example.

Figure 7A:
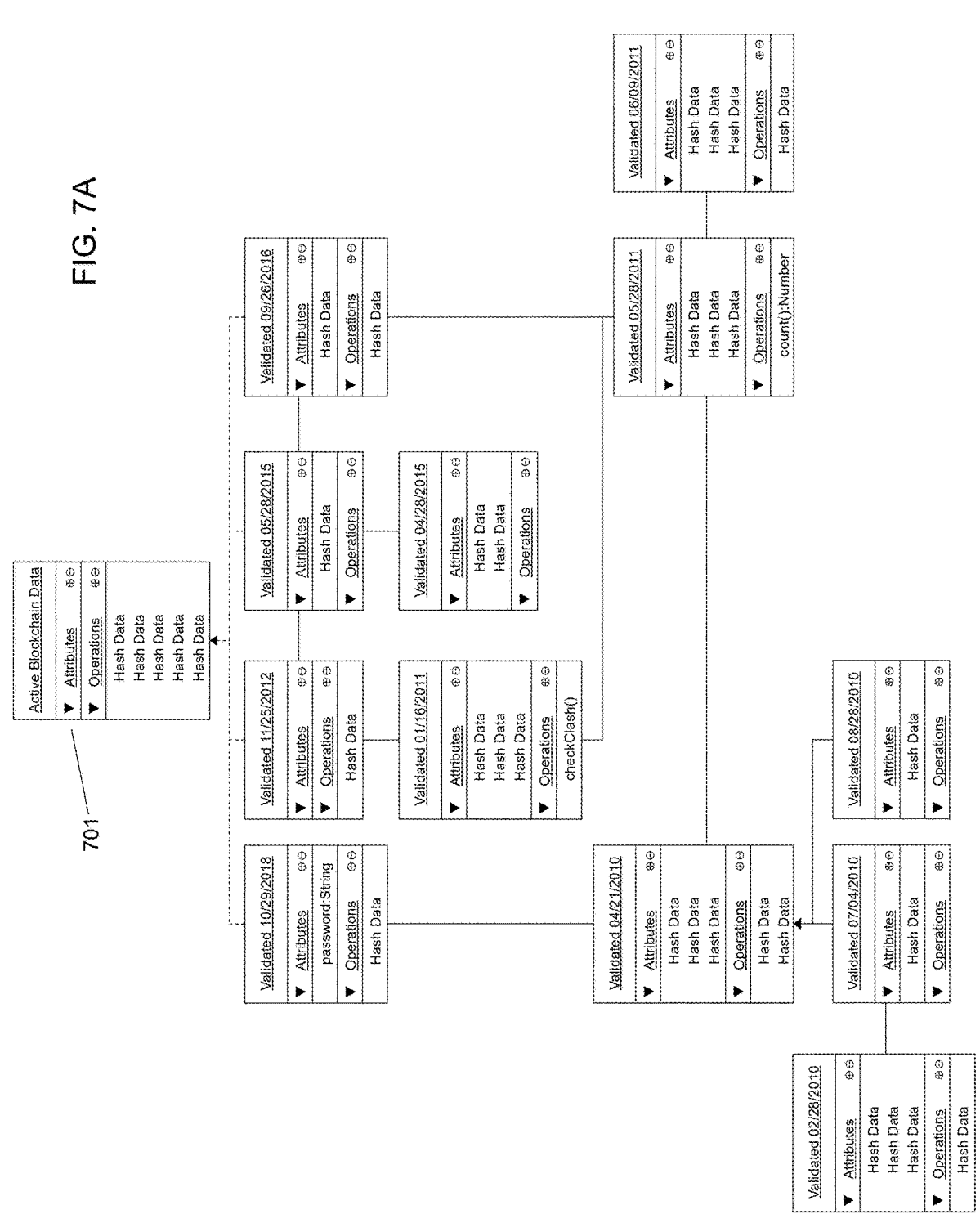
FIG. 7A illustrates an example format of the blockchain before pruning.
Figure 7B:
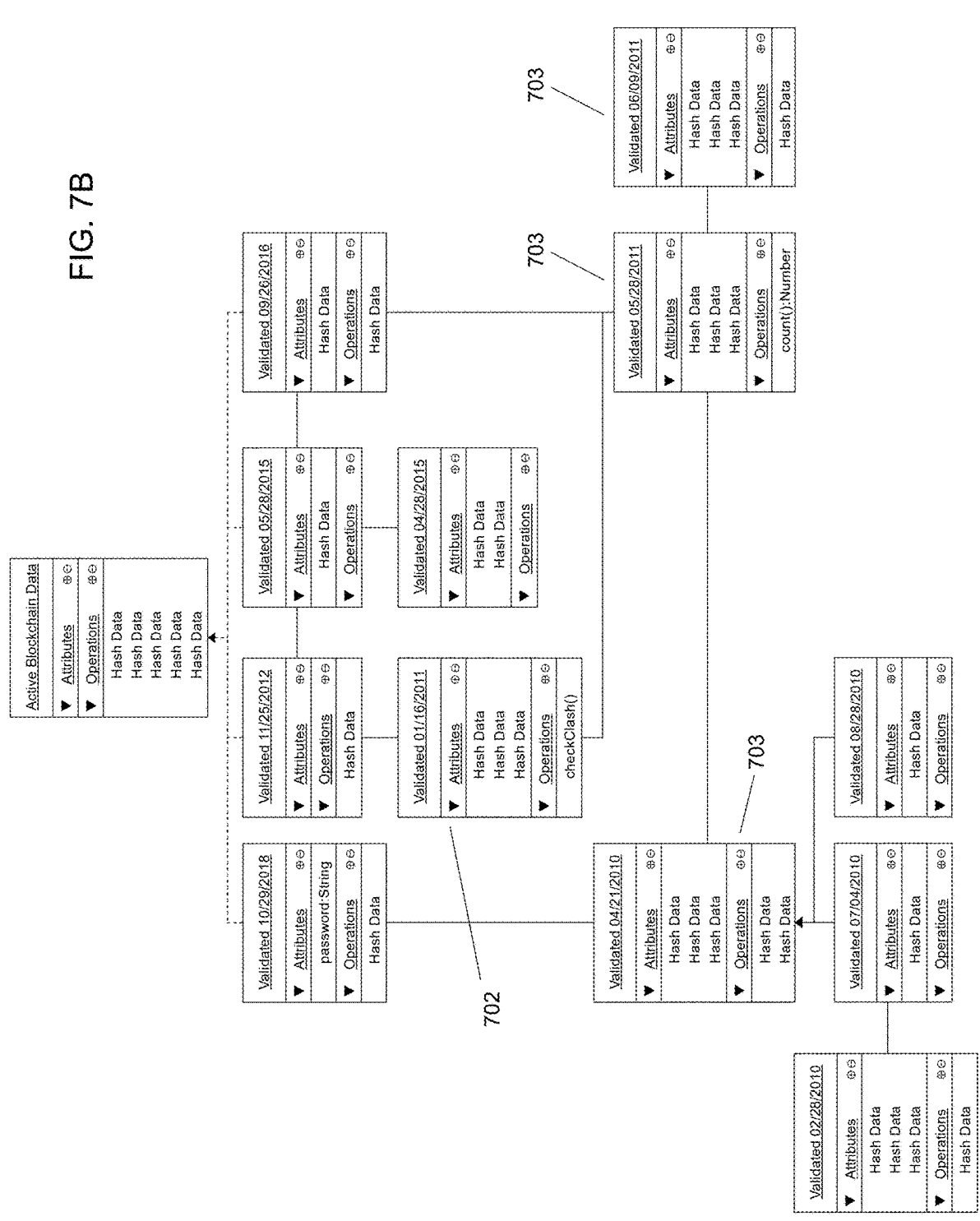
FIG. 7B illustrates an example format of the blockchain during pruning.
Figure 7C:
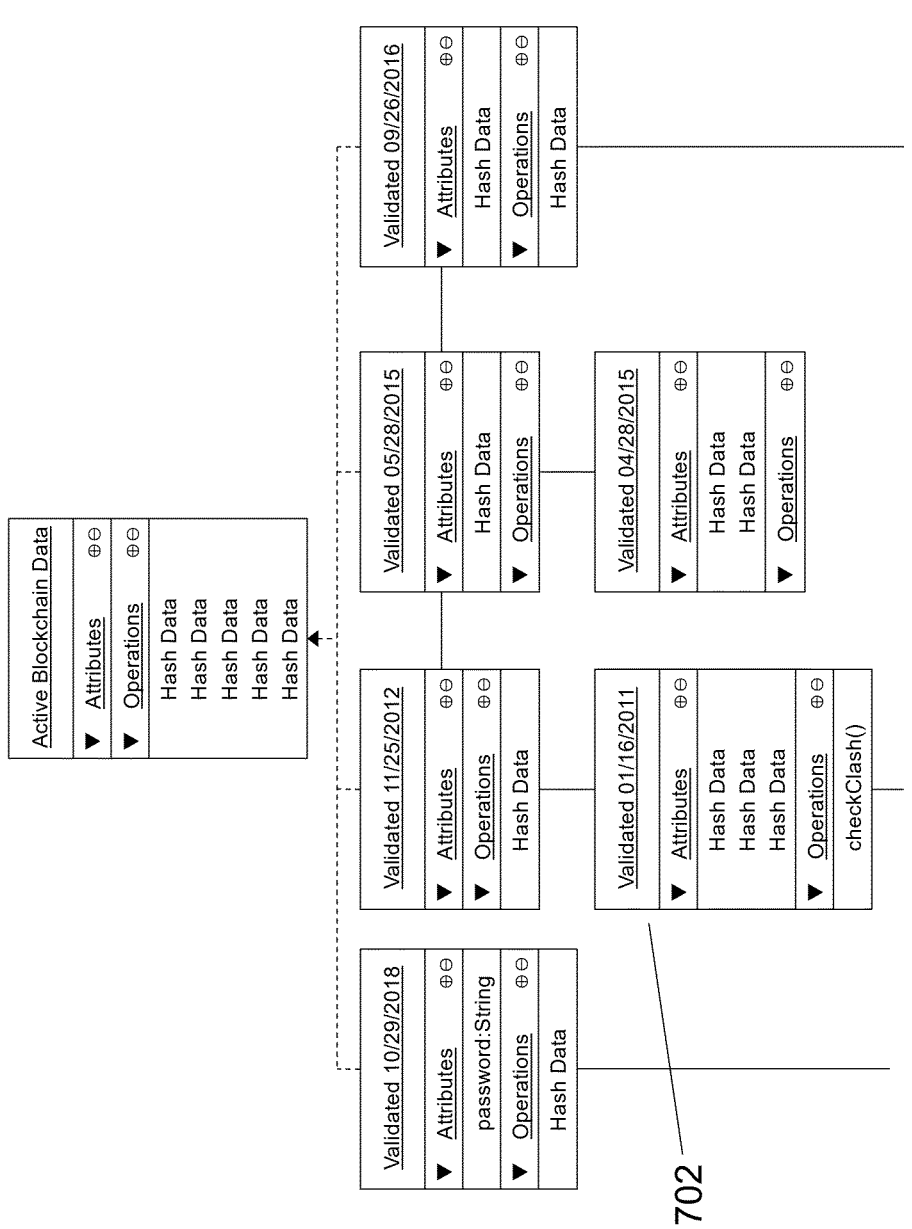
FIG. 7C illustrates an example format of the blockchain after pruning.

Referring to FIGS. 7A, 7B, and 7C, an example format of the blockchain before pruning, during pruning, and after pruning is illustrated. As illustrated in FIG. 7A, before pruning, the active block 701 contains hash data from previous blocks. During pruning, illustrated in FIG. 7B, the blockchain will initially be checked to see if all the data has been validated. If the older blocks 703 have been validated and synced, then the pruning process may begin. Generally, the blockchain will have a trigger event to determine when to begin pruning, and once the requirements of the trigger event are met, the nodes will begin validating and syncing the older blocks 703. This trigger event could be based on size of the blockchain, a certain time frame, or some other event which displays the need to truncate the blockchain. Once the older blocks have been validated and synced, the older validated blocks are pruned and a new starting point is created based on the oldest of the recent nodes 702. FIG. 7C illustrates the new blockchain after pruning. After pruning, the blockchain is reduced in size, and the starting point of the blockchain is now the oldest of the recent blocks 702. This allows the blockchain to not become so large as to detrimentally affect performance.

Figure 8:
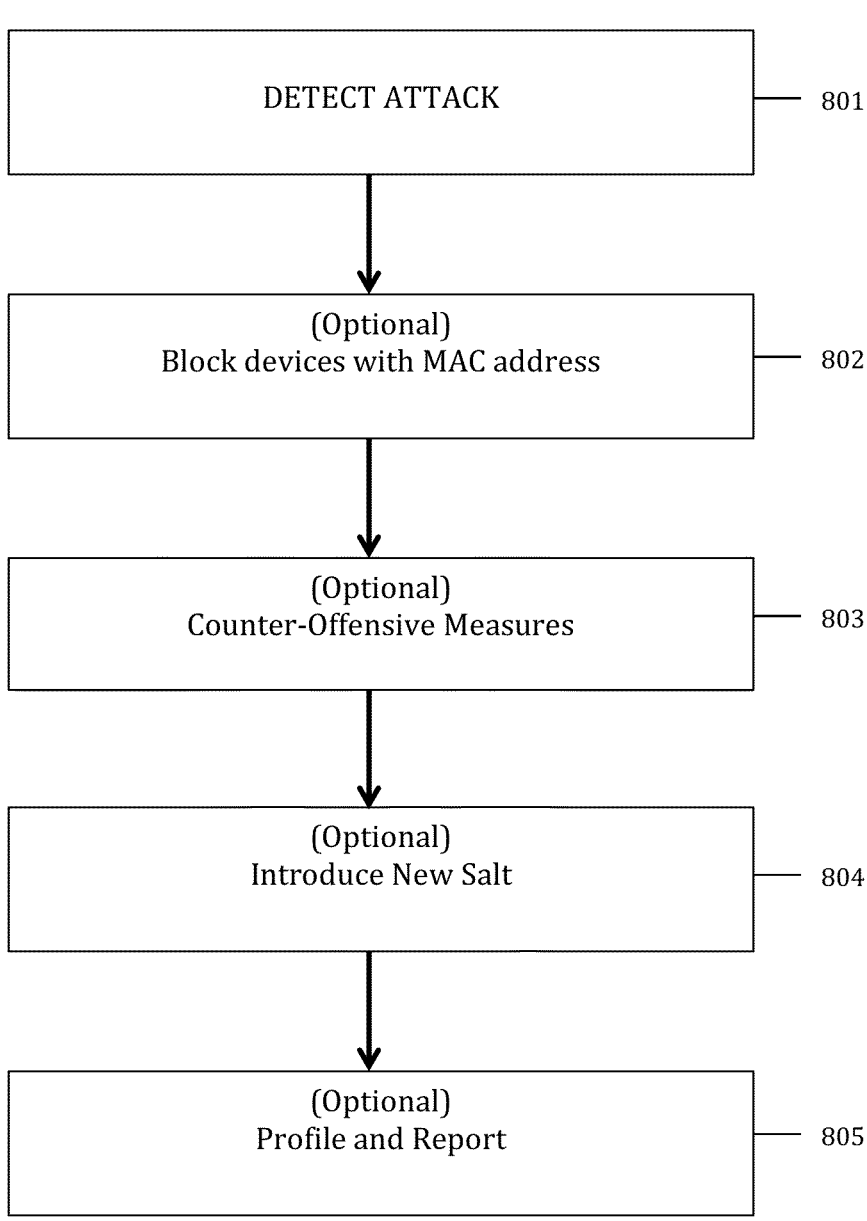
FIG. 8 illustrates optional measures available after the detection of a potential attack on a network.

FIG. 8 depicts a series of measures a network may execute in response to an attack detected in accordance with the principles disclosed herein. One or more, and optionally all, of these measures may be implemented in a network. In step 801, an attack is detected by the unaffected nodes in a network. Once the attack is detected, the MAC address of the attacking device is determined and shared among the unaffected nodes. A network appliance, such as a firewall, participating in the blockchain can serve as a centralized enforcement point for remediation tactics. Other users within the network that participate in the blockchain can help use the MAC address to help pinpoint the location of the attacking device. In some embodiments, a smart contract can be used to adjust when and how enforcement is conducted.

A network monitor may be configured to detect a potential attack by monitoring for diminishing speeds in network traffic coupled with a recent change of the gateway. If these conditions are detected, the network monitor notifies an administrator of a potential attack.

In step 802, an optional measure is to block all devices with the MAC address of the attacking device, and further to block the attacking device from receiving a new IP address via the Dynamic Host Configuration Protocol (DHCP). As a result, the attacking device will not be able to connect to the network, even if it statically assigns itself an IP address (since the MAC address remains the same). The operator of the attacking device may then be inclined to contact the network administrator or support team, thus revealing their identity. This measure may be particularly useful for detecting a malicious employee attempting to execute an attack within a corporate network.

In step 803, the network administrator or other authorized party may coordinate to take one or more counter-offensive measures. Examples of such measures include attempting to intercept the attacker's network traffic, installing software on the attacking device, and performing fingerprinting of the attacking device. Further examples include probing the attacking device, profiling the attacking device, conducting vulnerability scans on the attacking device, passively monitoring the attacking device (including traffic to/from the device), and attempting to gain or regain control over the attacking device. Any of the foregoing may facilitate obtaining more information on the attacking device, the attempted attack, and the attacker. The network administrator or other authorized party may also run exploits against the attacking device. When executing counter-offensive measures, care should be taken to conform to applicable laws and regulations.

In step 804, if the network administrator, other authorized party, and/or the unaffected nodes in the network detect that the salt has been compromised, a new salt is introduced to the entire network of unaffected nodes. A compromised salt may be inferred by identifying a node's MAC address that does not belong on the network but continues to support the blockchain and/or is unable to be removed. The new salt is then deployed to all devices on the network that do not share the suspected MAC address. In some embodiments, one or more repeater nodes may be placed to further secure the distribution of the new salt. Introducing a new salt effectively restructures the layout of the existing blockchain. From that point on, any node attempting to reuse the prior salt can be flagged as a compromised device under the control of a potential attacker.

In step 805, the network administrator, other authorized party, and/or the unaffected nodes optionally create a profile on the attacking device and/or the malicious actor(s) behind the attacking device. For example, a profile may reflect the attacking device's MAC address, operating system, services, ports, and other attributes. By tracking additional attributes, the network can potentially identify the attacker even if the attacking device attempts to spoof another MAC address. A threshold may be set for common attributes so that a device that meets the threshold triggers an alert and/or a report. The device may then be treated as suspect and investigated further. By building profiles of known malicious actors, the network may be able to more quickly identify potentially malicious actors on the network in the future.

Applying the principles disclosed herein, a blockchain may be used to track attributes of participating nodes and monitor for suspicious activity. For example, if two or more nodes suddenly share common attributes, that may be an indication that a worm, ransomware, or other attack is being perpetrated on the network. If two or more nodes experience common failures and/or error messages, or if a common port is being opened across devices on the network, that may also indicate an attack. Use of the blockchain as described herein may enable the network to detect and take remedial measures against such an attack.

Coins

In some embodiments, the blockchain may incorporate the use of a coin or token (hereafter referred to as a "coin"). A smart contract may be used to adjust if and when a coin is issued to a device on the network, and when and how a coin is accepted to permit entry into the network. Any suitable algorithm(s) for generating a coin may be used. As one example, an algorithm may involve a print-in-time snapshot of the existing blockchain combined with a system clock entry and the decoding of a one-time hashing challenge that rotates periodically (e.g., after a predetermined number of seconds). In some configurations, a coin is issued as an incentive to support the network and/or to act as a reward for supporting the objectives of the network. On a corporate network, authentication of a device may require an initial startup coin issued by the company. Coins may also be issued as rewards, and/or used to demonstrate longevity with the company, and/or used to track absences or productivity. For example, if no coins are issued to a user on a certain day, it can be inferred that the user was absent from work or otherwise not productive that day. Productivity may be determined statically, dynamically, and/or by an artificial intelligence or machine learning algorithm(s). Coins may be redistributed to new devices or users as individuals and old devices leave and new ones enter.

The use of coins may enable the detection of a potential attacker on a secured network. For example, a network may be configured to notify the network administrator whenever a new device is admitted. A potentially compromised device supplying a partial or whole coin to be authenticated on the network would trigger an alert to the network administrator. This is particularly true in a centralized environment where the ownership of a coin is known to belong to a specific device, and another device attempts to use the stolen coin. The administrator can be alerted and/or the coin can become marked as "stolen." Depending on the configuration, the potentially compromised device can be quarantined or placed onto a honey chain (described below) for further investigation.

Older nodes with a longer history of supporting a given network may have accrued more coins over that time. When the network is operating in a decentralized manner, the cache of coins may entitle the node to more influence, such as increased voting power for votes on changing the network and/or increased ability to enforce new behaviors on the network. Such coins may also be perceived to support a user's reputation or lead to other benefits such as promotions or job opportunities for the user.

Coordination of Blockchains

Sharing information between blockchains, either within a single network or between multiple networks, can further help identify malicious actors and limit their ability to compromise a network. Once an attacker has been identified, the fingerprint of the attacking device is stored on the blockchain of the affected network. The fingerprint is then shared with one or more other blockchains. The receiving blockchain(s) can then use the fingerprint to scan for a potential attack by the same attacker. In this regard, the coordinating blockchains are effectively able to pass along a "WANTED" poster or a "Be On The Lookout" poster for the attacker. Within a single network or a group of coordinated networks, running multiple blockchains enables one or more blockchains to maintain a desired level of privacy while reporting suspected (or known) attackers to one or more public blockchains.

From the list of suspected (or known) attackers, patterns and/or statistics may be generated and optionally shared among interested and coordinating parties to help identify patterns and achieve faster detection of potential attacks. For example, if an attacker's MAC address is known, it can be shared among trusted nodes. If a node is able to passively or actively witness network traffic of the attacker's MAC address, the node is within close proximity of the attacker's device. The node can be configured to alert other nearby trusted nodes and/or a network administrator. By conducting one or more network probes (such as traceroute, ping, or port-scan) and analyzing the results of those probes, the trusted nodes can attempt to triangulate the approximate location of the attacker's device. The use of artificial intelligence and/or machine learning algorithms may further facilitate and enhance these capabilities.

Coordination of blockchains can be configured so that devices associated with one network are prevented from joining or accessing another network. In one example, in the context of two competing businesses, each business maintains its own centralized blockchain that tracks company devices with authorization to access company files. By configuring the centralized blockchain of the first company to coordinate with the centralized blockchain of the second company, the businesses can ensure that a node on one blockchain is not able to join the competitor's blockchain. By making the centralized blockchains public, the companies can prevent a common user from accessing the blockchains of both companies, even from different devices. Such an arrangement may be useful to prevent an employee from attempting to work remotely for both companies simultaneously. Such an arrangement may also be used to detect an employee of one company attempting to connect to a network at a competitor. For example, a public (or otherwise shared) blockchain identifies a device as belonging to an employee of one company, and that device enters a competitor's building and attempts to connect to the competitor's guest wireless access point. In this example, the competitor can readily identify the device as belonging to the first company and respond accordingly.

However, a public blockchain containing information on a company's employees and network devices carries risks as well. For example, a public blockchain displaying IP addresses may enable someone to conduct reconnaissance on the company, its locations, and where future locations may be constructed. Thus, caution should be exercised when using a public blockchain, including for the reasons described herein.

Investigative Measures

Blockchain technology as disclosed herein may be leveraged to further investigate a suspected attacker on a network. In one example, a network operates a main blockchain and a separate split chain (a "honey chain," sometimes referred to as a honey pot or honey net) which is developed as a decoy blockchain intended to facilitate monitoring. Once an attack is detected, the honey chain is created and consists of a replica of the original chain up to the point where the attack was detected. From there, random and non-impactful transactions are recorded on the honey chain to deceive the attacker into believing the honey chain is the main blockchain. Coins earned, used, or leveraged on the main blockchain may be silently destroyed. Namely, through agreement among confirmed legitimate nodes, the coins are no longer considered to serve a functional purpose in the network's main blockchain. However, these "destroyed" coins remain on the decoy blockchain and appear to the attacker as if they are being used in the decoy network, and thus the attacker may not realize that it has been placed in the decoy network. In this example, the main network is prevented from accepting the attacker node's transactions, while the attacker node is not made aware that is blocked from the main network. Further investigative measures may be taken, such as having legitimate nodes provide false data to the attacker using the silently destroyed coin. This will maintain the illusion for the attacker that it is still on the main network. If the attacker logs onto another network that leverages the public blockchain, this can be used to trace the attacker's moves and/or continue the honey net.

In some embodiments, a network may employ decoy transactions to detect the presence or behavior of an attacker. Legitimate nodes are instructed to ignore a special transaction (hereafter a "warrant canary" transaction) which is designed to identify a potential attacker. Periodically and/or upon suspecting the presence of an attacker, the warrant canary transaction is served on the network, including to the suspected attacker. Legitimate nodes ignore the transaction, but an unsuspecting attacker would confirm the transaction, thus identifying itself as an unauthenticated node. As an alternative, legitimate nodes can be instructed to approve a warrant canary transaction but only with additional details hashed. An attacker would not know the additional details, and confirming the transaction without such details would identify the attacker as an unauthenticated node. Taking this a step further, a network can be configured to provide a false reward for confirming a warrant canary transaction. Specifically, the confirming node would receive a special coin (a "burned" coin), signaling to the other nodes on the network that the confirming node may be an attacker. Once a potential attacker has been identified, transactions that occurred before the node was compromised may be analyzed, voided, and/or split into a separate chain.

A threshold may be set for certain nodes which have served to provide a longstanding history of confirming transactions. Once a node reaches the threshold, the node may be identified as potentially in need of maintenance or replacement. For example, in a network in which one coin is earned for every one week of device uptime, and devices are scheduled to be replaced after two years (corresponding to 104 coins), a device that has accumulated 130 coins indicates that the device is out of compliance and requires replacement. Optionally, the device could be permitted to continue service by deducting an amount of coins accordingly. For example, by deducting 78 coins, the device would be left with 52 coins. The device could then operate for another year before again reaching the threshold.

An optional defensive measure is to limit nodes' ability to confirm transactions on a blockchain. Examples including limiting transaction confirmations temporally (by day, time of day, time since last confirmation, and/or other suitable criteria), or by geolocation of confirming nodes. As another example, a threshold may be set for the number of transactions a node can confirm over a period of time or as a percentage of total confirmations on the network. Such limits on a node's ability to confirm transactions can help identify if a malicious node repeatedly attempts to confirm the authenticity of another malicious node in order to give it access to the network, particularly if several attempts are made in a short period of time.

The foregoing principles disclosed herein may be leveraged to improve security and reliability in further contexts. For example, employees working remotely (including working from home) and zero trust services can leverage the principles disclosed herein, restricting a node's access only under certain predefined circumstances. An Internet Service Provider (ISP) can use this model to protect routes among its clients and/or other parties.

The principles can also be used to protect Domain Name Server (DNS) queries by enforcing known DNS endpoints and having those endpoints be recognized on a blockchain. If a DNS hijacking attack were to take place, the technology would allow for alerting if the node is not part of the blockchain. The principles can be used to ensure virtual private network (VPN) connections remain within the intended VPN entity(s). For example, a company offering VPN services can use the principles disclosed herein to ensure that traffic is not intercepted from its customer endpoints before connecting to the VPN provider. The VPN service provider can validate multi-hop connections and ensure no malicious interceptions have occurred at any of its data centers.

The principles disclosed herein may be used for enforcement of software licensing by identifying devices that are not in compliance and/or by allowing peer software to intervene in place of the original software provider. For example, certain software programs and/or packages may participate in a blockchain as a method of validating a user's key for the software. As long as the user's software is able to participate in the confirming of transactions, the software is deemed to have an authentic license. In some implementations of a subscription-based model, the software would need to be able to confirm transactions as dynamically as required by the owner of the licensed technology. For example, a software company can introduce a new salt that only subscribing customers would be privy to. Any licensee that is not able to confirm additional transactions on the blockchain would be deemed invalid, and any invalid device could cease operation or force the customer to contact customer support, make a license payment, and/or take other required measures. In some embodiments, anti-virus software features may incorporate the principles disclosed herein.

The detailed description is not intended to be limiting or represent an exhaustive enumeration of the principles disclosed herein. It will be apparent to those of skill in the art that numerous changes may be made in such details without departing from the spirit of the principles disclosed herein.

What is claimed is:

1. A system of invoking informational security, the system comprising:
   a plurality of nodes on a network, wherein each node comprises:
      a ledger of information;
      a communication channel with at least one other node;
      a storage unit configured to store the ledger of information and compare the information stored in the ledger against information from at least one other node's ledger; and
   wherein each of the plurality of nodes is configured to:
      detect a suspected attack by a suspected device on the network;
      dynamically identify the media access control (MAC) address of the suspected device; and
      share the MAC address with one or more of the plurality of nodes.

2. A system according to claim 1, wherein at least one of the plurality of nodes is configured to, in response to the suspected attack, attempt to intercept a communication from the suspected device on the network.

3. A system according to claim 1, wherein at least one of the plurality of nodes is configured to, in response to the suspected attack, install software on the suspected device.

4. A system according to claim 1, wherein at least one of the plurality of nodes is configured to, in response to the suspected attack, perform fingerprinting of the suspected device.

5. A system according to claim 1, wherein:
   at least one of the plurality of nodes is configured to, in response to the suspected attack:

detect whether a salt used in updating the ledger of information has been compromised; and
if the at least one of the plurality of nodes detects that the salt has been compromised, deploy a new salt to the plurality of nodes on the network other than the suspected device.

6. A system according to claim 1, wherein:
at least one of the plurality of nodes is configured to, in response to the suspected attack, create a profile on the suspected device.

7. A system according to claim 1, further comprising:
a smart contract implemented by the plurality of nodes, the smart contract configured to issue one or more reward coins to each of the plurality of nodes according to a predetermined algorithm;
wherein the predetermined algorithm is configured to assign a reward coin to one of the plurality of nodes in response to the node supporting one or more objectives of the network.

8. A system according to claim 7, further comprising:
a plurality of startup coins stored in the ledger of information;
wherein each of the plurality of startup coins is assigned to one of the plurality of nodes and authenticates the node on the network.

9. A system according to claim 1, further comprising:
a smart contract implemented by the plurality of nodes, the smart contract configured to issue a coin value to each of the plurality of nodes according to a predetermined algorithm;
wherein the predetermined algorithm is configured to assign a coin value to each of the plurality of nodes in response to the node reaching a predetermined threshold of device uptime.

10. A system according to claim 1, wherein each of the plurality of nodes is configured to ignore a warrant canary transaction served on the network.

11. A system according to claim 1, wherein each of the plurality of nodes is configured to approve a warrant canary transaction with additional details hashed.

12. A system according to claim 1, wherein each of the plurality of nodes is limited from confirming transactions on the network according to one or more of the group consisting of: number of transactions per day, time of day, time since last transaction confirmed by the node, and geolocation of the node.

13. A system of invoking informational security, the system comprising:
   a plurality of nodes on a network, wherein each node comprises:
      a ledger of information;
      a communication channel with at least one other node;
      a storage unit configured to store the ledger of information and compare the information stored in the ledger against information from at least one other node's ledger; and
   wherein each of the plurality of nodes is configured to:
      detect a suspected attack by a suspected device on the network;
      identify the media access control (MAC) address of the suspected device;
      share the MAC address with one or more of the plurality of nodes;
   wherein at least one of the plurality of nodes is configured to, in response to the suspected attack:
      detect whether a salt used in updating the ledger of information has been compromised; and if the at least one of the plurality of nodes detects that the salt has been compromised, deploy a new salt to the plurality of nodes on the network other than the suspected device.

14. A system according to claim 13, wherein at least one of the plurality of nodes is configured to, in response to the suspected attack, attempt to intercept a communication from the suspected device on the network.

15. A system according to claim 13, wherein at least one of the plurality of nodes is configured to, in response to the suspected attack, install software on the suspected device.

16. A system according to claim 13, wherein at least one of the plurality of nodes is configured to, in response to the suspected attack, perform fingerprinting of the suspected device.

17. A system according to claim 13, wherein at least one of the plurality of nodes is configured to, in response to the suspected attack, attempt to intercept a communication from the suspected device on the network.

18. A system according to claim 13, wherein at least one of the plurality of nodes is configured to, in response to the suspected attack, install software on the suspected device.

19. A system according to claim 13, wherein at least one of the plurality of nodes is configured to, in response to the suspected attack, perform fingerprinting of the suspected device.

20. A system of invoking informational security, the system comprising:

a plurality of nodes on a network, wherein each node comprises:

a ledger of information;

a communication channel with at least one other node;

a storage unit configured to store the ledger of information and compare the information stored in the ledger against information from at least one other node's ledger; and wherein each of the plurality of nodes is configured to:

detect a suspected attack by a suspected device on the network;

identify the media access control (MAC) address of the suspected device;

share the MAC address with one or more of the plurality of nodes;

a smart contract implemented by the plurality of nodes, the smart contract configured to issue one or more reward coins to each of the plurality of nodes according to a predetermined algorithm;

wherein the predetermined algorithm is configured to assign a reward coin to one of the plurality of nodes in response to the node supporting one or more objectives of the network;

a plurality of startup coins stored in the ledger of information; and wherein each of the plurality of startup coins is assigned to one of the plurality of nodes and authenticates the node on the network.

* * * * *